US008240244B2

(12) United States Patent
McKnight

(10) Patent No.: US 8,240,244 B2
(45) Date of Patent: Aug. 14, 2012

(54) TOOL FOR CONTROLLING THE QUANTITY OF PARTICULATES CONTAINED IN A RECEPTACLE

(76) Inventor: Philip Lewis McKnight, Mosman (AU)

( * ) Notice: Subject to any disclaimer, the term of this patent is extended or adjusted under 35 U.S.C. 154(b) by 512 days.

(21) Appl. No.: 12/517,187

(22) PCT Filed: Dec. 3, 2007

(86) PCT No.: PCT/AU2007/001859
§ 371 (c)(1),
(2), (4) Date: Jun. 1, 2009

(87) PCT Pub. No.: WO2008/067590
PCT Pub. Date: Jun. 12, 2008

(65) Prior Publication Data
US 2010/0050881 A1    Mar. 4, 2010

(30) Foreign Application Priority Data
Dec. 4, 2006  (AU) ................. 2006906793

(51) Int. Cl.
A47J 31/40   (2006.01)
A47J 31/44   (2006.01)
A47J 43/28   (2006.01)
(52) U.S. Cl. ............... 99/286; 15/236.05; 15/245.1
(58) Field of Classification Search .......... 15/104.16, 15/236.1, 245.1, 236.01, 236.05, 236.06; 366/281, 279; 81/488; 73/426, 429; 99/286
See application file for complete search history.

(56) References Cited

U.S. PATENT DOCUMENTS

| | | | |
|---|---|---|---|
| 486,451 A | 11/1892 | Espel | |
| 583,775 A * | 6/1897 | Swift | 366/281 |
| 628,073 A * | 7/1899 | Cornelius | 366/281 |
| 2,015,244 A * | 9/1935 | Stockdale | 366/309 |
| 2,081,735 A * | 5/1937 | Caronia | 15/245.1 |
| D120,759 S * | 5/1940 | O'Bryon | D10/46.3 |
| 2,459,466 A * | 1/1949 | Spreen | 73/426 |
| 3,035,344 A * | 5/1962 | Brown | 30/115 |
| 3,137,879 A * | 6/1964 | Dootson | 15/245.1 |
| 3,761,026 A * | 9/1973 | Rohmer | 241/199.12 |
| 4,089,562 A * | 5/1978 | Baumeister | 299/100 |
| 4,534,827 A * | 8/1985 | Henderson | 216/101 |
| 5,090,816 A * | 2/1992 | Socha | 366/293 |
| D373,291 S * | 9/1996 | Auker | D8/1 |
| 5,660,632 A * | 8/1997 | Volpe et al. | 118/213 |

(Continued)

FOREIGN PATENT DOCUMENTS

| | | |
|---|---|---|
| FR | 2713906 A1 | 6/1995 |
| JP | 2003310443 A1 | 11/2003 |
| JP | 2005245588 A1 | 9/2005 |

OTHER PUBLICATIONS

Rombauer, Irma et al., "Joy of Cooking", 1975, The Bobbs-Merrill Company, Inc., pp. 546, 557.*
International Search Report of PCT International Patent Application PCT/AU2007/001859.

*Primary Examiner* — Steven Wong
(74) *Attorney, Agent, or Firm* — Los Angeles Patent Group; Arman Katiraei

(57) ABSTRACT

The invention provides a tool (10) for use in controlling quantity of congregatable particulates, such as coffee, contained in a receptacle. The tool (10) includes support means (20) and a blade (18). The support means (20) are adapted to be supported by a wall of the receptacle. The blade (18) is for contacting an upper surface of the congregated particulates. The tool (10) is movable relative to the receptacle wall.

14 Claims, 5 Drawing Sheets

U.S. PATENT DOCUMENTS

| | | | |
|---|---|---|---|
| 5,676,463 A * | 10/1997 | Larsen | 366/251 |
| 5,791,526 A | 8/1998 | Landais et al. | |
| 6,751,869 B2 * | 6/2004 | Paggeot | 30/169 |
| 6,974,056 B2 * | 12/2005 | Rea | 222/460 |
| 7,472,595 B2 * | 1/2009 | Ploix | 73/426 |
| 2003/0192142 A1 * | 10/2003 | Veith | 15/235.4 |
| 2005/0016383 A1 | 1/2005 | Kirschner et al. | |
| 2009/0007436 A1 * | 1/2009 | Daskal et al. | 30/346 |

* cited by examiner

TOOL FOR CONTROLLING THE QUANTITY OF PARTICULATES CONTAINED IN A RECEPTACLE

CROSS REFERENCE TO RELATED APPLICATIONS

This patent application claims benefit to International Application PCT/AU2007/001859 entitled "A Tool for Controlling the Quantity of Particulars Contained in a Receptacle" filed on Dec. 3, 2007. International Application PCT/AU2007/001859 claims benefit to the Australian patent application 2006906793 entitled "Precision Coffee Dosing Tool & Method" filed on Dec. 4, 2006.

TECHNICAL FIELD

The present invention relates to a tool for use in relation to particulates contained in a receptacle. More particularly, this invention relates to a tool for controlling the quantity of particulates contained in the receptacle.

BACKGROUND ART

Conventionally, espresso coffee beverage is prepared by forcing heated water at around 90 to 96 degrees Celsius through ground coffee, under an atmospheric pressure of between 8 to 9 atmospheres. Pump pressure is applied to heated water in a boiler which is forced through ground coffee typically contained in a coffee basket (or sometimes referred to as a delivery filter). The coffee basket may be built in or mounted on an espresso machine.

It is well recognised that there are three factors governing the quality and consistency of the espresso coffee beverage produced by an espresso machine. They include:

1) grinding—which affects the fineness or coarseness of the ground coffee;
2) pack pressure—which refers to the pressure applied to the ground coffee contained in the coffee basket; and
3) dosage—the amount of ground coffee contained in the coffee basket.

Factors 1) and 2) above can be controlled easily by a barista. Factor 3), however, is difficult to control with any precision or consistency. For example, if the coffee basket of a commercial espresso machine holds a nominal 20 grams of ground coffee, a dose variation of plus or minus 0.5 grams would significantly affect the quality and consistency of the flavour of the extracted espresso beverage.

There are three traditional methods to control the dose of ground coffee. These are:

1) use of a plurality of volumetric chambers provided in a 'dosing chamber' which may be found in almost all commercial coffee grinders;
2) use of an adjustable grinder, in which the duration of grinding time may be predetermined and adjusted;
3) manually sweeping a set amount of excess coffee from the unpacked ground coffee already contained in a coffee basket. It is important to note that in this circumstance, it is the 'unpacked' ground coffee that is swept.

Method 1) has a disadvantage that, regardless of the level of ground coffee in the dosing chamber, the amount of dispensed coffee is never consistent enough to produce doses of ground coffee with a high degree of precision. This is due to a number of factors, such as the cleanliness of the exit port of the dosing chamber, the rate at which the barista operates the dosing lever on the carousel of the dosing chamber, the moistness of the ground coffee (depending on the degree of hydration of the ground coffee which in turn depends on the duration of time for which the ground coffee is left in the dosing chamber), and the amount of coffee wasted or lost over the sides of the coffee basket during dosing. This method is believed to have a consistency of plus or minus 2.0 grams.

Method 2) has the shortcoming that the amount of coffee ground and ejected along a horizontal port of the grinder body varies greatly from operation to operation as it relies on consistent packing of coffee from the burrs of the grinder to a point where the ground coffee falls over the edge of the port into a dispensing chamber. It should be noted that coffee is a slightly oily substance and as such tends to clump together in a random fashion. This random clumping means that the amount of ground coffee that falls from the port into the chamber would and could never be the same, even though the grinding burrs are operated for exactly the same duration of time. This method is believed to have a consistency of plus or minus 1.5 grams.

The disadvantage and shortcoming of methods 1) and 2) above mean that most users resort to method 3). Method 3) has the drawback that it is a manual operation and depends on the barista collapsing the ground coffee in the basket by tapping or dropping the coffee basket several times on a hard surface to settle the ground coffee to the same volume, and then sweeping off excess coffee at a constant speed each and every time. This is virtually impossible to achieve. This method is believed to have a consistency of plus or minus 1.0 gram.

It is therefore an object of the present invention to provide a tool that may alleviate the disadvantages, shortcomings or drawbacks of the abovementioned prior art or at least provide the public with a useful alternative.

SUMMARY OF THE INVENTION

According to one aspect of the present invention, there is provided a tool for use in controlling quantity of congregatable particulates contained in a receptacle, the tool including: support means adapted to be supported by a wall of the receptacle; and a blade for contacting an upper surface of the congregated particulates, the tool being movable relative to the wall.

The tool is preferred to be made of a durable material. The durable material may be anodised aluminium.

The tool may be a leaf having two rebates on opposing sides thereof, the rebates forming the support means being adapted to engage a rim of the wall of the receptacle.

Preferably the blade is adapted to in use penetrate into the congregated particulates whereby rotational movement of the blade effects scraping of an amount of congregated particulates to be subsequently discarded.

The blade is preferred to have at least one bevelled surface so as to facilitate penetration into and scraping of the particulates. The blade may have two bevelled surfaces, one facing in an opposite direction to the other. The or each bevelled surface is preferred to have an angle of between 30 to 40 degrees to the vertical in use. The or each bevelled surface may extend from a centre of the leaf towards one side. The two bevelled surfaces may be identical in shape. The or each bevelled surface may have a first plateau at the foot of the bevel. Alternatively, the or each bevelled surface may have a second plateau at the peak of the bevel.

The quantity of scraped particulates may be dictated by a distance (L) between an upper end of the support means and the lower end of the blade.

The receptacle may be a delivery filter having a circumferential wall.

The tool preferably is adapted to rotate relative to the wall.

According to another aspect of the present invention there is provided a method of controlling a quantity of congregatable particulates contained in a receptacle, the method including the steps of:

(1) delivering into the receptacle an amount of congregatable particulates, the amount being in excess of a desired quantity;

(2) applying pressure to the delivered particulates to effect congregation to a desired extent;

(3) selecting a tool of the invention with a desired length (L) calculated from the upper end of the support means to the lower end of the blade;

(4) effecting contact between a wall of the receptacle and the support means of the selected tool;

(5) penetrating the blade of the tool into the particulates;

(6) moving the tool in relation to the wall so as to effect scraping of an amount of particulates; and (7) removing the scraped particulates by inverting the receptacle.

In case it is desired to remove a larger amount of congregated particulates, the method may include the further steps of:

(8) substituting the tool with one having a longer blade length (L); and (9) repeating steps (5) to (7) described above.

Preferably, the congregated particulates are ground coffee.

BRIEF DESCRIPTION OF THE DRAWINGS

In order to achieve a better understanding of the nature of the present invention a preferred embodiment of a tool for use in controlling quantity of congregatable particulates contained ha a receptacle will now be described, by way of example only, with reference to the accompanying drawings in which.

DETAILED DESCRIPTION OF THE INVENTION

Best Mode of Carrying out the Invention

Figure 1:
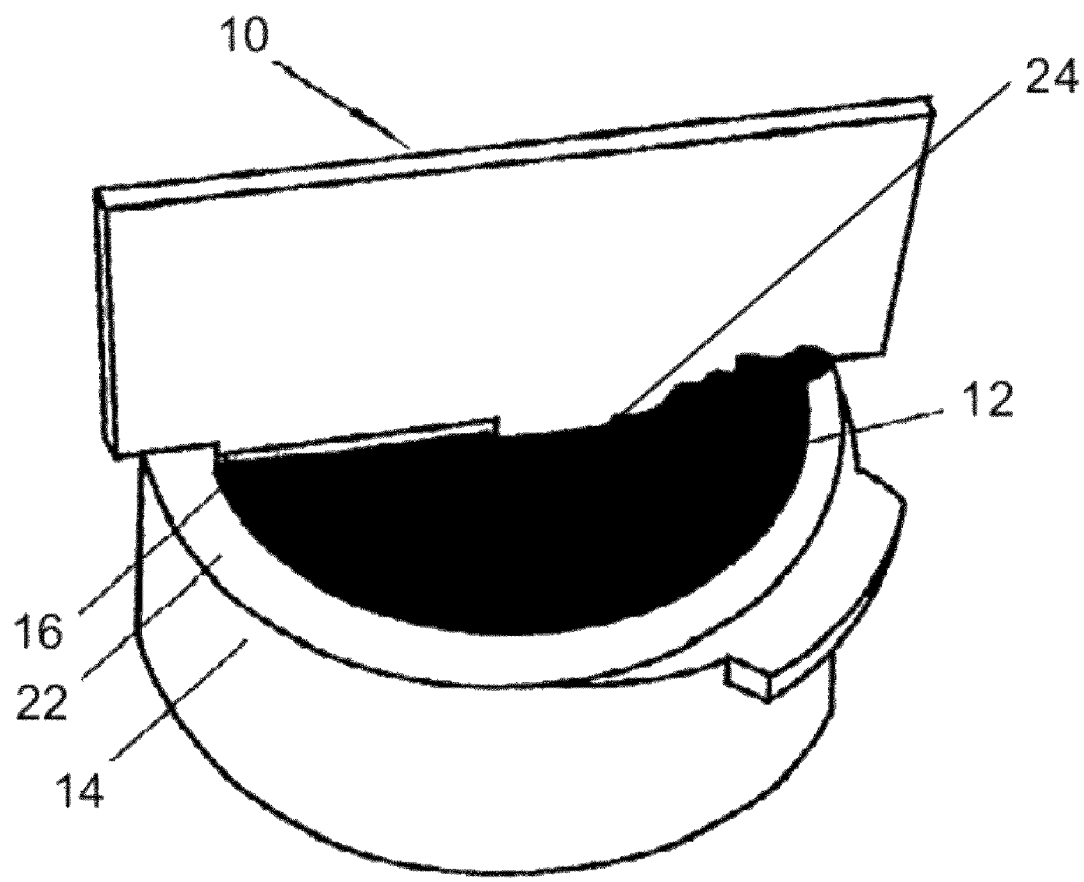
FIG. 1 is a perspective view of a preferred embodiment of the tool of the present invention in use.
Figure 2:
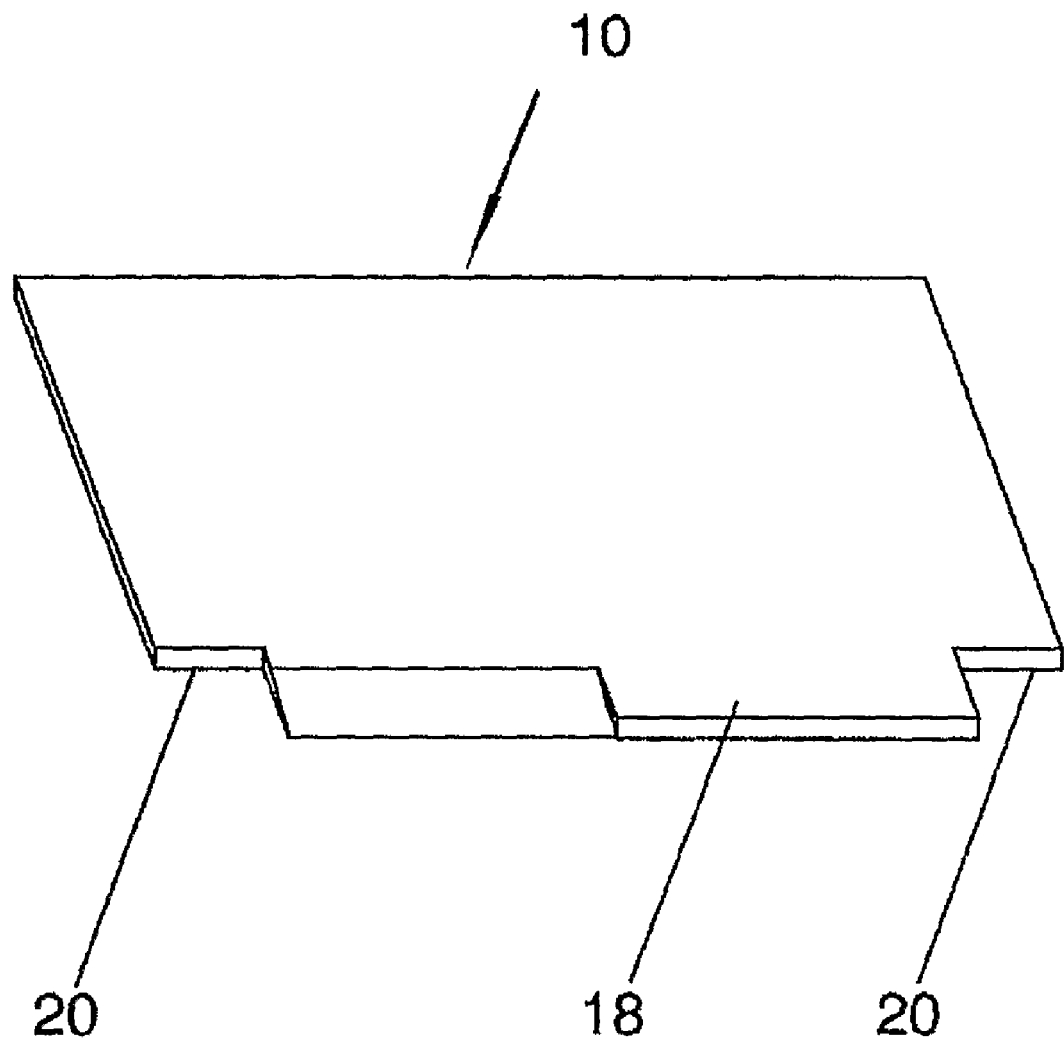
FIG. 2 is a perspective view of the tool of FIG. 1 not in use.
Figure 3:
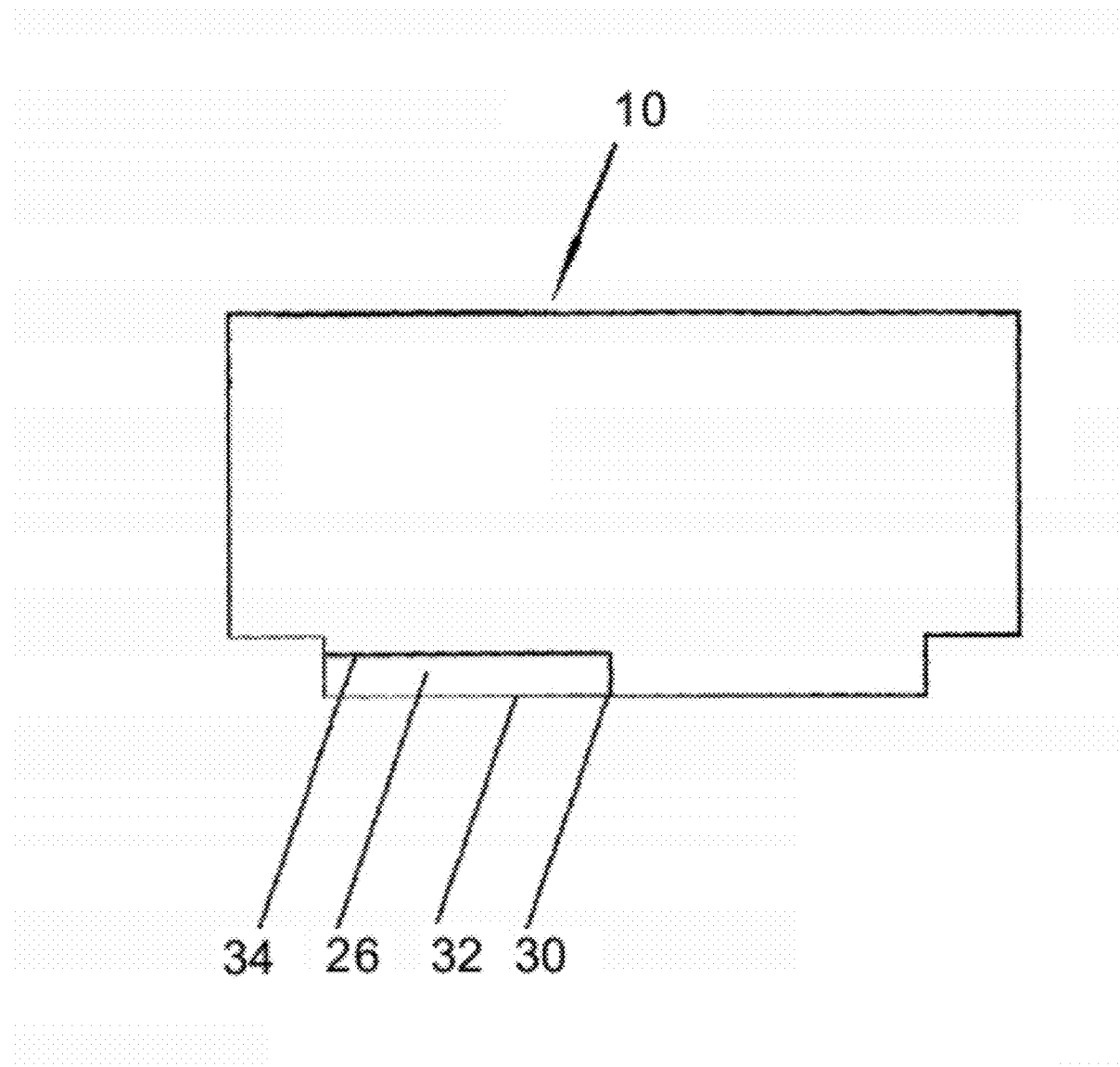
FIG. 3 is a front elevation of the tool of FIG. 1.
Figure 4:
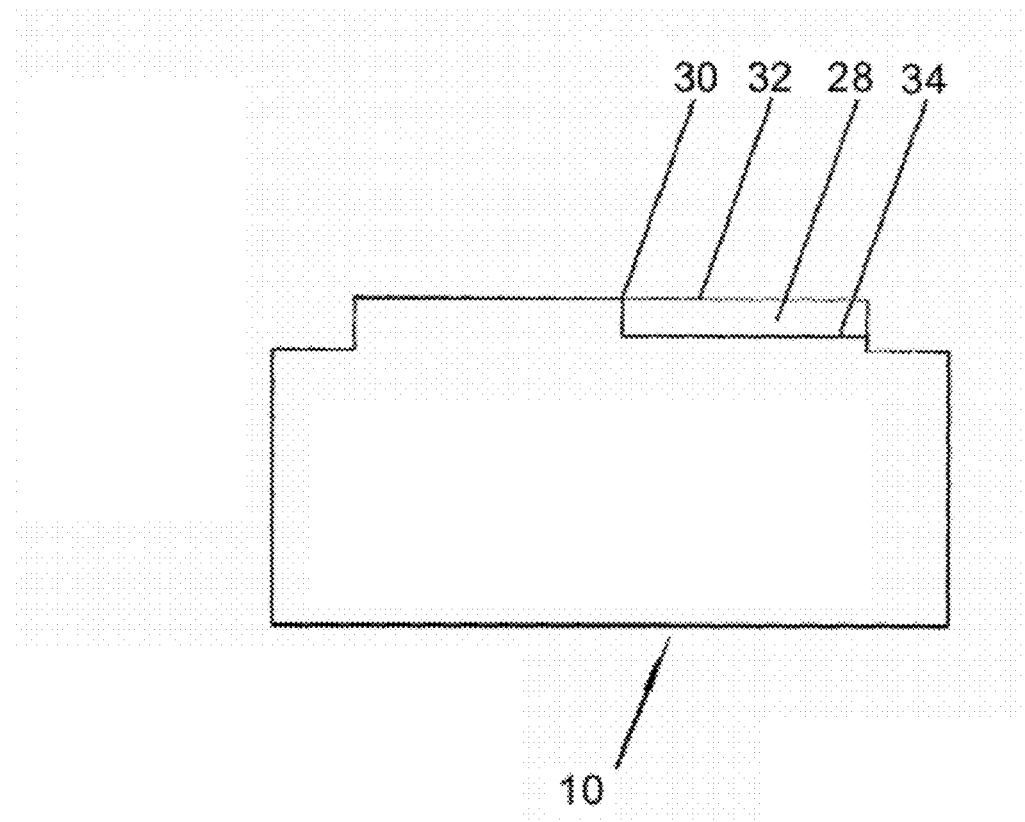
FIG. 4 is a rear elevation of the tool of FIG. 1.

As shown in FIGS. 1 and 2, there is a tool 10 for use in controlling quantity of congregatable particulates 12 (in this case, ground coffee) contained in a receptacle 14. The tool 10 includes a blade 18. The tool 10 takes the form of a leaf having two rebates 20 on opposing sides thereof. The rebates 20 form the support means adapted to engage a rim 22 of the wall 16 of the receptacle 14. The tool is movable relative to the wall 16. The receptacle 14 is a delivery filter having the circumferential wall 16. The delivery filter is adapted to attach to an espresso coffee machine where it is infused with pressurised hot water to produce espresso shots.

The blade 18 is for contacting an upper surface 24 of the congregated particulates 12. In use, the blade 18 is adapted to penetrate into the congregated particulates 12 whereby movement of the blade 18 effects scraping of an amount of congregated particulates 12 to be subsequently discarded. The tool 10 is adapted to rotate relative to the wall 16. In the present embodiment, the blade 18, once immersed or inserted in the congregated particulates 12, is configured to be moved in a clockwise direction to perform the scraping function.

Figure 5:
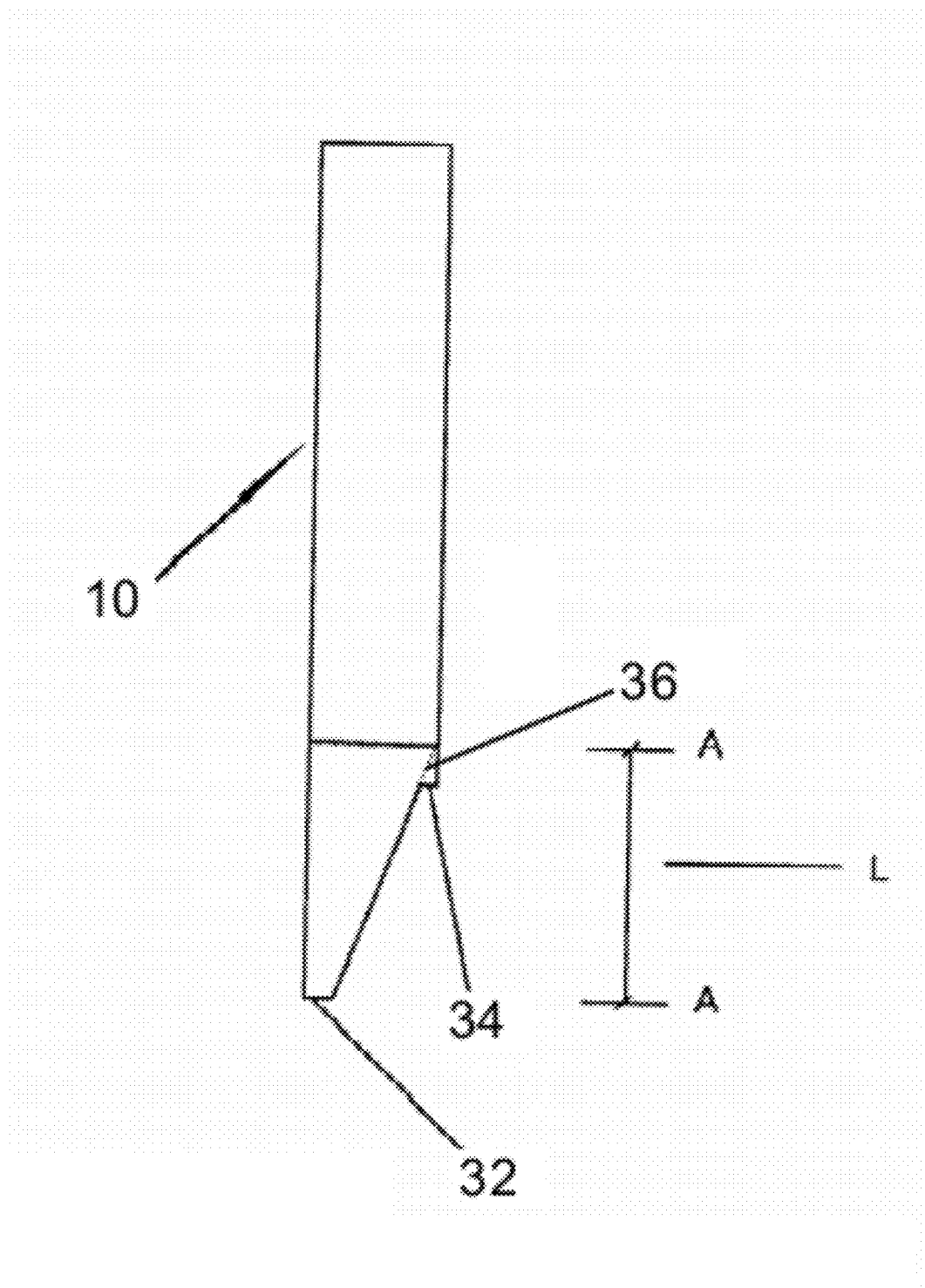
FIG. 5 is a side elevation of the tool of FIG. 1.

The blade 18 has two bevelled surfaces 26 & 28 so as to facilitate penetration into and scraping of the particulates 12. The bevelled surface 26 faces in an opposite direction to the bevelled surface 28. The bevelled surfaces 26 & 28 are preferred to have an angle of between 30 to 40 degrees to the vertical in use. The two bevelled surfaces 26 & 28 may extend from a centre 30 of the leaf towards one side. The two bevelled surfaces 26 & 28 are identical in shape. Referring to FIG. 5, it can be observed that each bevelled surface 26 or 28 has a first plateau 32 at the foot of the bevel 26 and a second plateau 34 at the peak of the bevel 26.

The quantity of scraped particulates 12 is dictated by a distance (L) between an upper end of the rebates 20 and the lower end of bevelled surfaces 26 & 28 of the blade 18 indicated by A-A (FIG. 5). Different doses of coffee may be effected by varying the distance (L). A range of differently sized tools 10 may be provided for this purpose.

It should be noted that the tool of the present embodiment is made of a durable material such as anodised aluminium.

The tool 10 of the present invention may be used in the following method to control the quantity of congregatable particulates 12 contained in the receptacle 14. The method includes the steps of:

(1) delivering into the receptacle 14 an amount of congregatable particulates 12, the amount being in excess of a desired quantity;

(2) applying pressure (of preferably between 20 kg to 30 kg) to the delivered particulates 12 to effect congregation to a desired extent (this is often referred to as "packing" and is typically done by way of a tamping device) resulting in pack pressure;

(3) selecting a tool of the invention with a desired length (L) calculated from the upper end of the support means to the lower end of the blade;

(4) effecting contact between the circumferential wall 16 of the receptacle 14 with the rebates 20 of the selected tool 10 with a desired length (L);

(5) penetrating the blade 18 of the tool 10 into the particulates 12;

(6) moving the tool 10 in relation to the wall 16 so as to effect scraping of an amount of particulates 12 (in the present embodiment, the tool 10 is configured to be moved in a clockwise direction); and (7) removing the scraped particulates 12 by inverting the receptacle 14.

It is anticipated that the scraped particulates 12 may be discarded or tipped back into the dosing chamber or dispensing vessel of a coffee grinder. Optionally, prior to extraction, a light polishing tamper may be applied to the ground coffee after removal of the tool 10.

It should be appreciated that the length (L) (refer to FIG. 5) of the blade 18 may be calculated from the upper end of the rebates 20 as discussed above, or the upper edge of the wall 16, to the lower edge of the blade 18.

In case it is desired to remove a larger amount of congregated particulates 12, the method may include the further steps of:

(8) substituting the tool 10 with a second tool of the invention having a longer blade length (L); and (9) repeating steps (5) to (7) described above.

Now that a preferred embodiment of the present invention has been described in some detail, it will be apparent to those skilled in the art that the tool may have at least the following advantages:

(i) offering a high degree of precision and consistency in controlling the quantity of ground coffee in the delivery filter;

(ii) substantial reduction of wasted ground coffee;

(iii) minimising negative repercussions of unevenly packed coffee in the delivery filter;

(iv) reduction of staff training time;

(v) eliminating the need of carrying out quality assurance and quality control checks;

(vi) easy to use and remove; and (vii) suitable for coffee baskets of different sizes for achieving a desired dose of ground coffee.

Those skilled in the art will appreciate that the invention described herein is susceptible to numerous variations and/or modifications other than those specifically described. For example, the blade 18 may be designed to in use move in an anticlockwise direction. Also, the tool 10 may have an enlarged portion such as a knob or handle to be grasped or held by the barista for rotation of the blade 18. Furthermore, the tool 10 may be made of another non-abrasive material with a high wear resistance. Finally, the second plateau 34 may be omitted such that one or both bevelled surfaces 26 and/or 28 would be like that indicated by a broken line 36 in FIG. 5.

INDUSTRIAL APPLICABILITY

The invention has industrial applicability in that it provides a tool which can give the benefit of controlling the quantity of congregated particulates contained in a receptacle with a high degree of precision and consistency.

The invention claimed is:

1. A tool for use in controlling quantity of congregatable particulates contained in a receptacle, the tool comprising:
an upper portion continuously extending horizontally from a first horizontal end to a second horizontal end while extending vertically upwards to provide a handle for operating said tool, said upper portion comprising support means at bottom corners of said upper portion that are located at said first horizontal end and at said second horizontal end and that are adapted to be supported by a wall of the receptacle; and
a lower portion extending a specified distance vertically downward from a level of said support means while continuously extending horizontally in between said support means at said first horizontal end and at said second horizontal end for the specified distance, said lower portion comprising a blade for contacting an upper surface of the particulates, the tool being movable relative to the wall;
wherein the support means are located on opposing sides of the tool and are adapted to simultaneously engage a rim of the wall of the receptacle;
wherein the blade has a lower edge which is adapted in use to penetrate into the particulates; and
wherein the lower edge has two bevelled surfaces, one facing in an opposite direction to the other.

2. The tool of claim 1, wherein said blade contacts an amount of particulates when moving said tool along an upper surface of the receptacle.

3. The tool of claim 1, wherein rotational movement of the blade effects scraping of an amount of particulates to be subsequently discarded.

4. The tool of claim 1, wherein each bevelled surface has an angle of between 30 to 40 degrees to the vertical in use.

5. The tool of claim 1, wherein each bevelled surface extends from a centre of the blade towards one side.

6. The tool of claim 1, wherein each bevelled surface has a first plateau at the foot of the bevel.

7. The tool of claim 3, wherein quantity of scraped particulates is dictated by a distance (L) between an upper end of the support means and the lower edge of the blade.

8. The tool of claim 1, wherein the receptacle is a delivery filter having a circumferential wall and said tool is shaped and sized to fit said delivery filter.

9. The tool of claim 1, wherein said tool is adapted to rotate relative to the wall.

10. The tool of claim 1, wherein said tool is made of anodised aluminum.

11. A tool for use in controlling quantity of congregatable particulates contained in a receptacle, said tool comprising:
a first support region comprising a horizontal projection that extends from a proximal end to a distal end along a bottom side of the tool, said first support region located towards a first horizontal end of the tool;
a second support region comprising a horizontal projection that extends from a proximal end to a distal end along the bottom side of the tool, said second support region located towards a second horizontal end of the tool that is at an opposite end of the tool from the first horizontal end, said first and second support regions for supporting said tool against an upper surface of the receptacle; and
a continuously solid planar body comprising a continuously solid planar downward extension i) that extends vertically a specified distance downward from a level of the first and second support regions to a bottom of said body and ii) that continuously extends horizontally from the proximal end of the first support region to the proximal end of the second support region for the specified distance downward, said downward extension comprising a blade at the bottom of said body, said blade for contacting an amount of the particulates when moving said tool along the upper surface of the receptacle, and wherein said blade comprises a first bevelled surface positioned in an opposite direction from a second bevelled surface.

12. The tool of claim 11, wherein said blade extends below the surface of the first and second regions by a specific fixed distance that is within a range of distances, wherein a longer distance for the specific fixed distance in the range of distances is for contacting a larger amount of the particulates, and wherein a shorter distance for the specific fixed distance in the range of distances is for contacting a smaller amount of the particulates.

13. The tool of claim 11, wherein said blade extends below the surface of the first and second regions by a particular distance, and wherein moving said tool along the upper surface of the receptacle controls a quantity of the particulates remaining within said receptacle.

14. The tool of claim 11, wherein the continuously solid planar body further comprises a continuously solid planar upward extension i) that extends vertically a specified distance upward from a level of the first and second support regions to a top of said body and ii) that extends horizontally from the distal end of the first support region to the distal end of the second support region, said upward extension for providing a handle to hold said tool when rotating said tool about the upper surface of the receptacle.

* * * * *